Figures 1, 2:
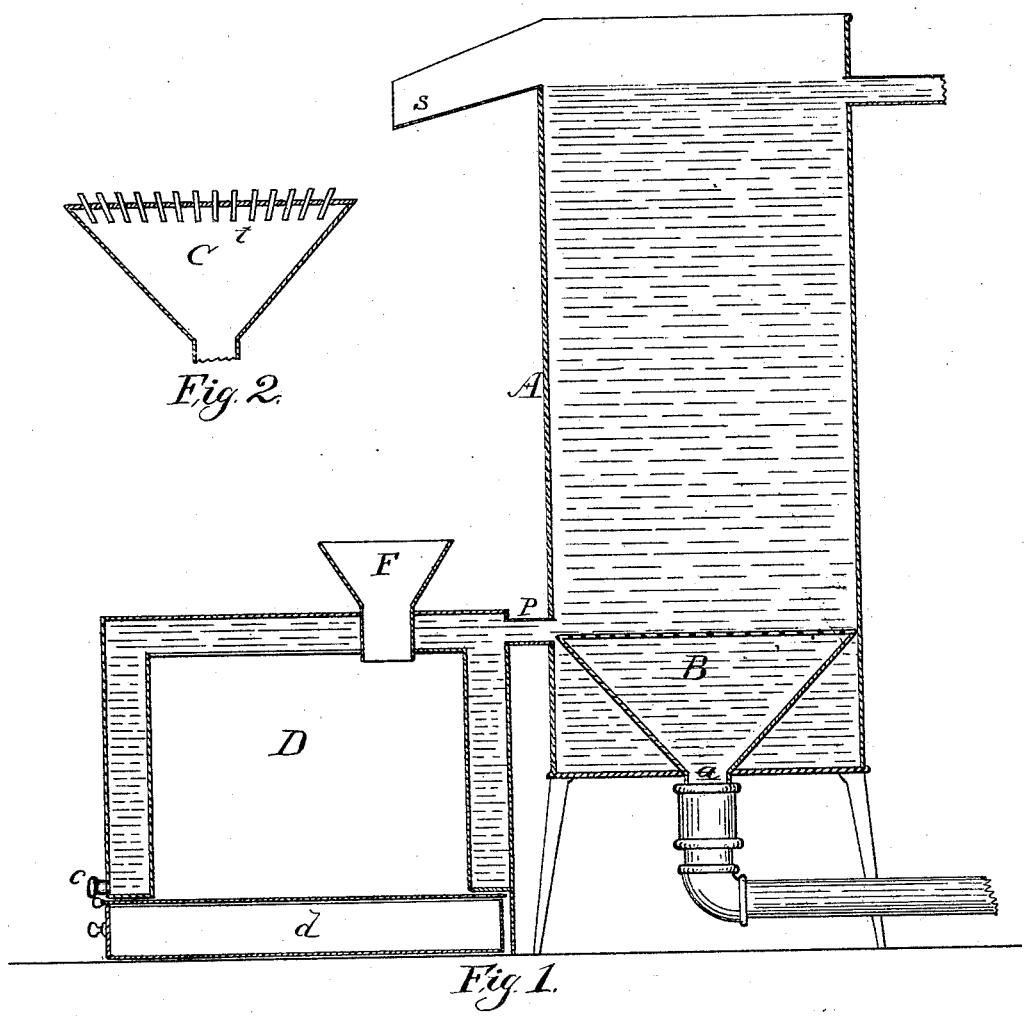

(No Model.)

E. KELLS.
METHOD OF AND APPARATUS FOR FREEZING PARAFFINE, &c.

No. 271,080. Patented Jan. 23, 1883.

Witness:
S. W. Tibbitts.
H. W. Rogers

Inventor,
Edward Kells,
By Geo. W. Tibbitts Atty.

UNITED STATES PATENT OFFICE.

EDWARD KELLS, OF CLEVELAND, OHIO, ASSIGNOR OF ONE-HALF TO DAVID A. DANGLER, OF SAME PLACE.

METHOD OF AND APPARATUS FOR FREEZING PARAFFINE, &c.

SPECIFICATION forming part of Letters Patent No. 271,080, dated January 23, 1883.

Application filed September 15, 1882. (No model.)

*To all whom it may concern:*

Be it known that I, EDWARD KELLS, of Cleveland, in the county of Cuyahoga and State of Ohio, have invented a certain new and useful Method of and Apparatus for Freezing Paraffine and other Products of Petroleum, of which the following is a specification.

My invention is especially adapted to obtaining crude paraffine or paraffine-wax from the oil and other substances found in petroleum and in the various products of petroleum, but may be used for the separation of the elements of other liquid substances in which one element congeals at a higher temperature than another.

The nature of my invention will be easily and fully understood by describing its application to the recovery of paraffine-wax from petroleum and its various products.

I take the substance from which I wish to remove the paraffine-wax, reduce it to a liquid state, if it is not already so reduced, and force it into the bottom of a tank containing a suitable liquid, the temperature of which is lower than the substance being operated upon, and sufficiently lower to properly chill the paraffine-wax while passing up through it. The shallower the cold liquid is the lower must be its temperature, while if the refrigerating-liquid is of great depth the temperature need not be reduced so low. The refrigerant must of course be heavier than the material being operated upon. Water at a low temperature, if of sufficient depth, will answer very well; but salt-water or brine is better, because its specific gravity is greater, and it will remain liquid at a lower temperature. The substance being treated is forced through an opening or openings in the bottom or near the bottom of the tank directly into the refrigerating-liquid, and the paraffine-wax, being lighter than the refrigerating-liquid, rises to the top in a congealed and granulated condition. I prefer forcing the substance being treated into the bottom of the refrigerating-liquid in small streams or jets, so that the refrigerant may quickly act upon all parts of it. The number of these streams or jets may be as many or few as desired. If the refrigerating material is of great depth, the streams or jets may be larger. If shallow, they should be smaller. The substance being treated may be forced into the refrigerant by a force-pump; or it may be supplied through a pipe or column of such height as to cause it to flow into the bottom of the refrigerating-liquid by the force of gravity or by any other known method. When the paraffine-wax has thus been granulated and rises to the top of the refrigerant in a congealed or partially-congealed condition, it may be removed in any convenient manner. The proper temperature of the refrigerating-liquid may be maintained in any of the well-known methods that will readily suggest themselves to any practical operator. It has been common heretofore to chill and congeal the paraffine in tanks surrounded by refrigerants; but this was a very slow and expensive process as compared with mine, and does not as thoroughly granulate the paraffine-wax.

Before my invention the substance being treated has been poured into the top of the refrigerating-liquid, and the paraffine-wax then taken out as it congeals. But this process is very defective for three reasons: First, it raises the temperature of the top of the refrigerant so that the congelation is very imperfect; second, the warm substance pouring into the top meets the upward-moving paraffine-wax, and becomes inclosed in its meshes and cells in such manner as to prevent much of the material from coming in contact with the refrigerant; third, the granulation of the paraffine-wax is exceedingly imperfect.

In my invention the substance being treated is introduced into the coldest part of the refrigerant, and as the particles congeal into granules and rise rapidly they are in a great measure separated from each other and quite thoroughly granulated when they reach the surface of the refrigerant. One of the peculiar merits of my invention is the beautifully-granulated condition of the paraffine-wax—a condition that greatly facilitates the after treatment of the wax to obtain pure paraffine.

It will be readily seen that machinery for carrying out my process may be almost infinitely varied. I do not therefore confine myself to any particular mechanism. I will, however, describe what I have invented and what I regard as a good apparatus for working my process. This mechanism is clearly shown in the drawings.

Figure 1 is a vertical tank or cistern for holding the refrigerant. Fig. 2 is a modification of the bottom of the refrigerating-tank.

A is a tank, preferably in cylindrical form; but it may be of any shape desired. It is open at the top, and has a closed bottom, having an inlet-pipe connection, a. In the bottom of the tank is a conical chamber, B, connected at the apex with inlet a and at the large end with the tank A, where it is perforated with a large number of holes to admit in small streams or jets the substance being treated. On one side, near the top, is a spout for the removal of the paraffine-wax. Opposite this spout, and a little below it, is an orifice for the inflow of the refrigerating-fluid. This fluid may be made cold by any of the well-known methods.

In place of the chamber B, I also make a conical-shaped chamber, C, under the tank A, as shown in Fig. 2, and supply it with a series of small short tubes, t, the object of which is to distribute the induction of the substance being treated into all parts of the bottom of tank A. In the use of the conical chamber B it is found that the larger portion enters at and near the center of the perforated diaphragm.

D is a receptacle for the paraffine-wax or chilled material as it flows over the spout, and consists of a vessel with a surrounding chamber designed for the refrigerating-liquid. This outer chamber is connected with the tank A by the pipe P. The bottom of the receptacle D is so constructed as to be readily withdrawn. Under this bottom is a drawer. At pleasure the bottom may be withdrawn, letting the paraffine-wax fall into the drawer. When the drawer is full the bottom can be returned and the drawer emptied. The outer chamber of the vessel D is also provided with an outlet, from which the refrigerating-fluid may be pumped back (its temperature properly reduced in its passage) to tank A.

It is well known that paraffine-wax retains a considerable amount of oil that must be separated in order to produce merchantable paraffine. If the wax is in a laminated condition, it is difficult to separate the oil. For this reason it is desirable that the crude paraffine or wax be secured in a condition as perfectly granulated as possible. From the granulated wax the oil is much more readily extracted in the after-treatment in the process of purifying the paraffine. By substituting naphtha or gasoline at low temperature for water or brine in my process this crude paraffine-wax may be reduced to liquid form by heat, and greatly purified and improved by passing it up through the naphtha or gasoline bath.

While my process and mechanism are especially designed to operate upon paraffine and other products of petroleum, yet I regard them as also adapted to obtaining stearine from vegetable and animal oils and substances, and for any other use where the object is to separate associated substances where one will congeal at a temperature at which others will remain liquid; and I regard my invention as broad enough to cover all such adaptations.

The theory of the recovery of paraffine by chilling or freezing is that, when the temperature is properly reduced, the paraffine will congeal before the oil and other substances with which it may be associated. When congealed it is really separated from the oil, &c.; but the oil will still adhere to the surface of the particles of paraffine and in the interstices between the particles. In this condition the paraffine is called "crude paraffine" or "paraffine-wax." This paraffine-wax is then subjected to further process to remove this oil, &c., by treatment with naphtha, a press, &c. If the paraffine-wax is obtained in a laminated state, it is much more difficult to remove the oil. Hence it is desirable to obtain the paraffine-wax by a process that will granulate it as far as possible. This, I believe, is done by my process.

Having thus fully described my invention, what I claim as new, and desire to secure by Letters Patent, is—

1. The process of separating such elements from a fluid compound as will congeal at a higher temperature than the other elements, consisting in causing the compound to pass upward through a comparatively cold liquid and in immediate contact therewith, substantially as described.

2. The process of freezing or chilling paraffine-wax and other products of petroleum, consisting in passing the material upward through a body of liquid refrigerant and in immediate contact therewith, substantially as described.

3. The process of freezing or chilling paraffine-wax or other products of petroleum, consisting in passing the material in a divided state upward through a liquid refrigerant and in immediate contact therewith, substantially as described.

4. The process of separating paraffine from oil and other elements with which it may be associated, consisting in forcing the compound in small streams into the base or bottom of a column of refrigerating-liquid and gathering the paraffine from the surface, substantially as described.

5. The process of chilling and separating paraffine-wax and other products of petroleum, consisting in passing the material upward through a refrigerating-liquid and in immediate contact therewith, and then carrying the product to a refrigerating-chamber, substantially as described.

6. The process of chilling paraffine-wax and other products of petroleum, consisting in conducting the material to be operated upon, under pressure, into a column of refrigerating-liquid, at or near the bottom of said column, substantially as described.

7. An apparatus for freezing or chilling paraffine-wax or other products of petroleum, consisting of a tank or receptacle for the refrigerating material and a pipe for conducting the substance to be operated upon into said tank at or near the bottom of the refrigerating material, substantially as described.

8. An apparatus for freezing or chilling paraffine-wax or other products of petroleum, consisting of a tank or receptacle for the refrigerating material and a device for forcing the material to be operated upon into the bottom of the refrigerating material in jets or small streams, substantially as described.

9. An apparatus for freezing paraffine-wax, consisting of a refrigerating-chamber provided with a drawer and slide-bottom or cut-off, substantially as described.

EDWARD KELLS.

Witnesses:
GEO. W. TIBBITTS,
M. G. NORTON.